Aug. 1, 1939.　　　S. S. GREEN　　　2,167,649
ELECTRIC METER
Filed Nov. 7, 1935　　　3 Sheets-Sheet 1
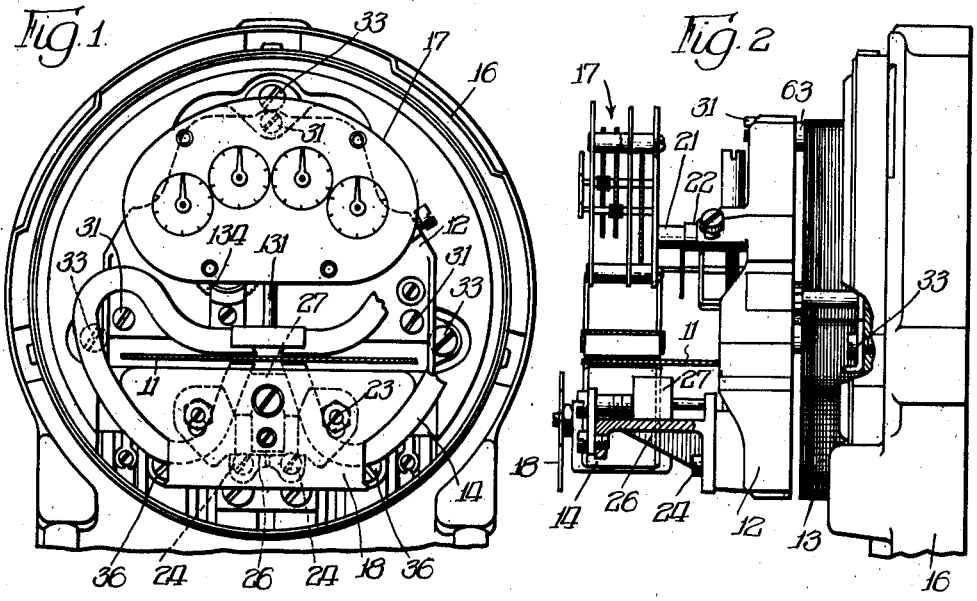
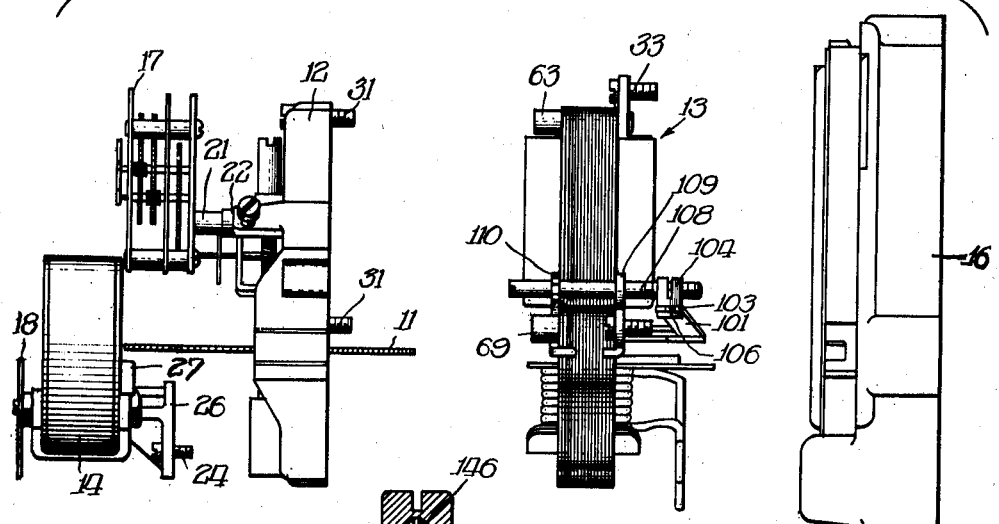
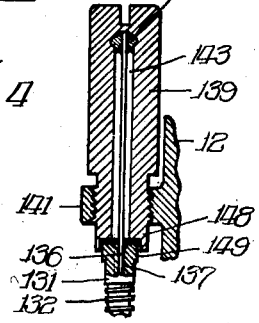
Inventor
Stanley S. Green.
By Louis Robertson
atty.

Aug. 1, 1939.  S. S. GREEN  2,167,649
ELECTRIC METER
Filed Nov. 7, 1935  3 Sheets-Sheet 2
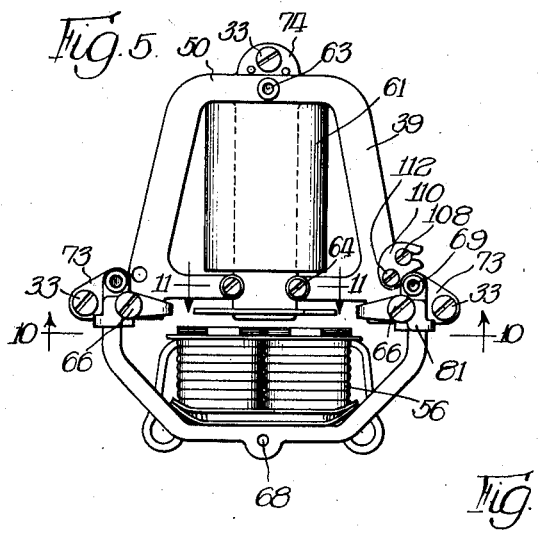
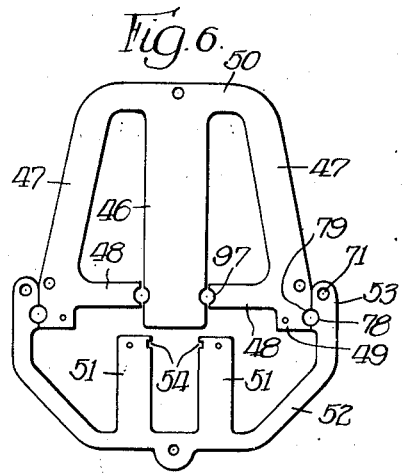
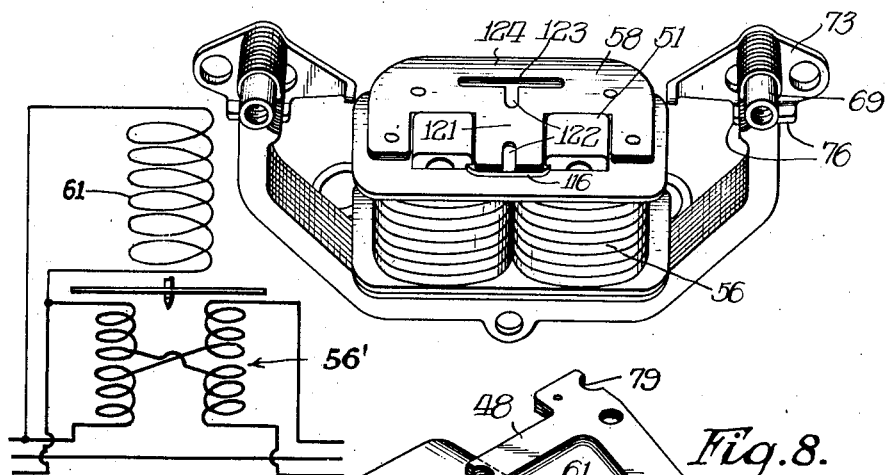
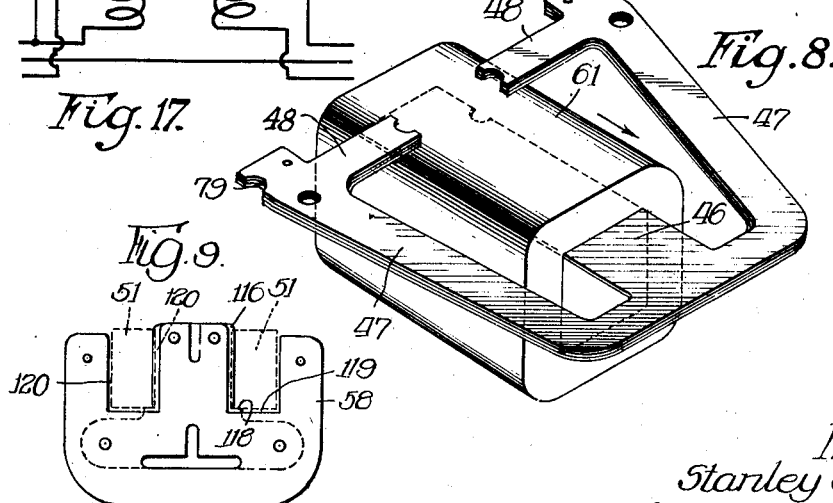
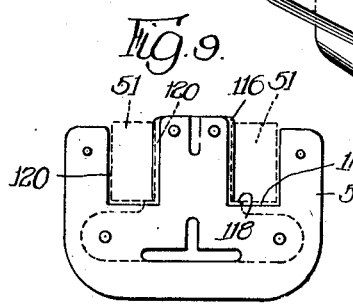
Inventor:
Stanley S. Green,
By Louis Robertson  atty.

Aug. 1, 1939.   S. S. GREEN   2,167,649
ELECTRIC METER
Filed Nov. 7, 1935   3 Sheets-Sheet 3
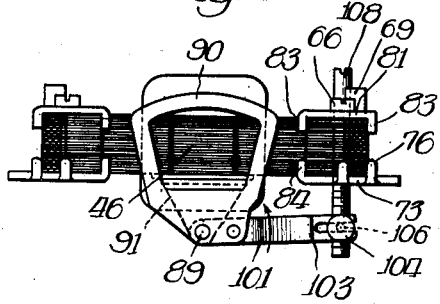
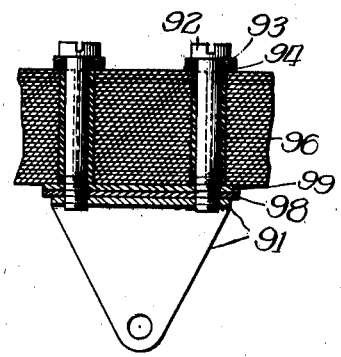
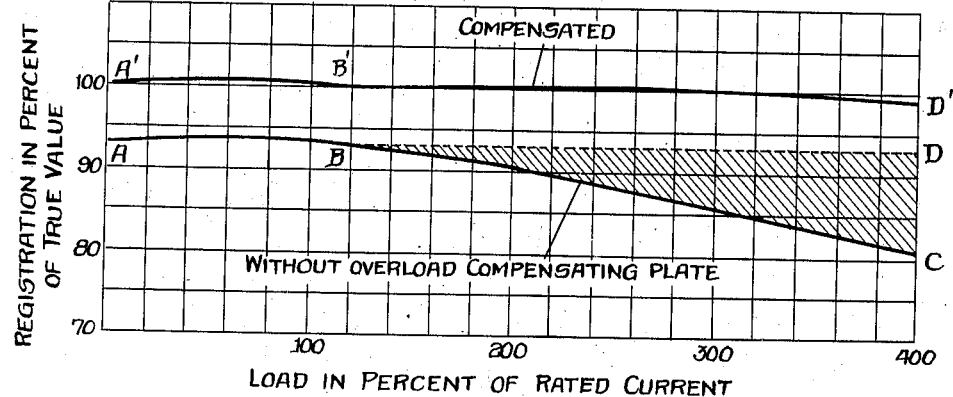
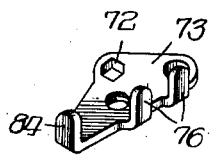
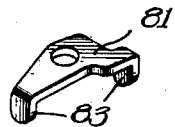
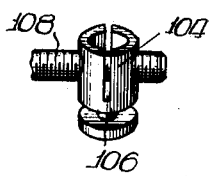
Inventor:
Stanley S. Green,
By Louis Robertson atty.

Patented Aug. 1, 1939

2,167,649

UNITED STATES PATENT OFFICE 2,167,649

ELECTRIC METER

Stanley S. Green, La Fayette, Ind., assignor to Duncan Electric Manufacturing Company, La Fayette, Ind., a corporation of Illinois Application November 7, 1935, Serial No. 48,713

35 Claims. (Cl. 171—34)

This invention relates to watt-hour meters, and has been illustrated as embodied commercially in a service type of meter such as might be used in a home or elsewhere for measuring the electrical energy used by the consumer.

Meters of this general type have long been known and, in fact, have given very satisfactory service. They have been the subject of so much engineering and inventive effort in the past that it might well have been supposed there was no room for such extensive improvements as are disclosed in this application. Nevertheless, the meter here disclosed has a number of advantages over prior art meters. These advantages include operating or electrical advantages, manufacturing advantages, and servicing advantages.

These various advantages are discussed more in detail below, but it may be stated here that the general object of the invention is to provide a meter having improved characteristics in the various fields of manufacture, operating, and servicing.

For convenience, the description of the novel features which follows this introductory discussion, is divided under the following headings:

A. *Servicing and assembly features.*—Under this heading is described particularly the construction of the meter which provides an adequately rigid mounting for the parts while permitting their ready removal, successively or as a complete meter mechanism, from the front of a base mounted on a wall, and their replacement without disturbing the adjustments of the meter.

B. *Laminated core structure.*—Under this heading is described particularly the rigid joint between the two separable stacks of laminations forming cores of the potential and current magnets; and also the particular shapes of these cores which facilitate manufacture of the magnets and at the same time produce better operating characteristics.

C. *Light load adjustment.*—The description under this heading deals particularly with the mounting and adjustment of the plate used for adjusting the meter for light loads and also serving as a phasing plate. Because the plate and the entire adjustment structure is carried by the core structure, and is free from play and is accessible for adjustment from the front of the meter, this structure is unusually satisfactory.

D. *Overload compensating plate.*—Under this heading is described the particular form of overload compensating plate which is outstanding because of its ease of adaptation to a given meter, and ease of manufacture, and because it permits the use of non-overhanging cores for the current magnets, thus facilitating applying the coils to these cores.

E. *Upper journal of the disc.*—Under this heading is described the novel manner of mounting the pin which properly positions the upper end of the shaft carrying the disc.

F. *General combination.*—Under this heading is described or reviewed the novel inter-relationships between the various novel features previously described.

In the drawings which illustrate the embodiment of the invention chosen for illustration:

Fig. 1 is a front elevational view of the meter with the cover removed and the lower parts of the base and a portion of one damping magnet broken away.

Fig. 2 is a side view of the structure shown in Fig. 1, with some parts broken away.

Fig. 3 is a view similar to Fig. 2, but showing the parts separated from one another.

Fig. 4 is a detailed sectional view showing the upper mounting for the meter disc.

Fig. 5 is an elevational view of the driving element.

Fig. 6 is a face view of the laminations used in the core structures, showing their assembled relation.

Fig. 7 is a perspective view of the current magnet structure with the overload plate in position.

Fig. 8 is a perspective view showing the insertion of the potential core laminations into the potential coil.

Fig. 9 is a plan view of the overload compensating plate.

Fig. 10 is a sectional view taken along the line 10—10 of Fig. 5.

Fig. 11 is a fragmentary sectional view through the line 11—11 of Fig. 5.

Fig. 12 is a graph showing the accuracy of the meter with and without the overload compensating plate.

Figs. 13 to 15 are perspective views of the plates 73, 81 and 74 respectively.

Fig. 16 is a perspective view on a larger scale of the coupler 104 and associated parts.

Fig. 17 is a diagrammatic illustration showing particularly a staggered arrangement of current coils for measuring a three-wire single phase circuit.

Although this invention may take numerous forms, and although most if not all of the improvements discussed may be used to advantage without the other improvements, only one form of the invention has been chosen for illustration;

this form embodying all the improvements since it is by combining them all that the best results are obtained. In fact, the various improvements are interrelated to such an extent that some have one advantage in themselves and an entirely different advantage in combination with others. A complete subdivision of the invention into its component parts seems impossible, but nevertheless it is believed advantageous for the purpose of clarity to subdivide the following description.

Watt-hour meters are now fairly well standardized as to general form, and the present meter includes the conventional or necessary elements, although most of these elements are very novel in form or include decidedly novel features. A conventional disc 11 is rotatably carried by a novel frame 12. A novel electromagnetic driving element 13 is provided for driving the disc, and permanent damping magnets 14 are provided for retarding the disc to a speed proportional to the power measured. The disc drives a conventional register 17. All of these parts are mounted in a novel manner on a base 16 which may be considered conventional, being covered in a separate application.

A. Servicing and assembly features

*Par. A1.* In servicing meters it is often necessary to remove from the base one or all of the various elements mentioned, and it is of course desirable that they be removed with the greatest possible ease and without the necessity of removing the meter base from the wall. On the other hand, it is vital that these elements be rigidly and dependably secured together and to the base. The present invention completely reconciles these two considerations. Furthermore, the adjustments of the meter are not affected when the parts are removed and again secured in place.

*Par. A2.* According to the present invention, all the various elements mentioned may be removed from the meter simply by unscrewing screws accessible from the front of the meter. Of course, it has heretofore been possible to remove some of the parts from the front of the meter, and in fact the attachment of the register 17 to the meter frame 12 by studs 21 secured in sockets 22 by suitable screws, as illustrated, is adopted from the prior art. The effectiveness and simplicity of the other features of attachment is new, however, and especially as to the completeness of the ready removability of all parts from a mounted base.

*Par. A3.* After the name plate 18 has been lifted off of screws 23, the damping magnet assembly may be removed from the frame 12 simply by removing the two screws 24. These screws secure a bracket 26 to the frame 12, and to the bracket 26 are secured the damping magnets 14 and the adjusting shunt 27. This shunt slides on the bracket 26 to divert more or less of the magnetism away from the disc 11. The principles of such adjusting shunts are well known and need not be discussed. The specific form of the damping magnet assembly is the subject matter of the applicant's prior copending application, Serial No. 37,669, filed August 24, 1935. From the standpoint of the present discussion, the important features of this damping magnet assembly are that it may be removed in the simple manner described, and when it has again been secured in place the adjustment accomplished by the shunt 27 remains unchanged.

*Par. A4.* The frame 12 may be removed from the portions of the meter behind it, either after the dampening magnet asembly has been removed from the frame, as above described, or with this assembly still secured to the frame. This is accomplished by removing the three screws 31, the two lower of which are accessible with a screw driver from the front of the meter and the upper of which is accessible from the front of the meter by a screw driver inclined slightly downwardly. As is seen from Fig. 2, the front plate of the register 17 is sufficiently far in front of the screw 31 so that, when the remaining plates of the register are cut down at the top as illustrated, the inclination of the screw driver in being applied to screw 31 will not be too great. Screws 31 screw into spacer rivets 63 and 69 secured to the laminations of the driving element 13. The disc 11, being mounted on frame 12, is of course removed with the frame.

*Par. A5.* After the damping magnet assembly or the frame 12, or both, have been removed from the driving element, or while both of these parts, or the frame 12 alone, are still secured to this driving element, the latter may be removed from the base by operations performed entirely from the front of the meter. This removal is accomplished merely by unscrewing the three screws 33, passing through ears formed by plates 73 and 74 secured to the laminated core structure as described in Paragraphs B8 and B10. Of course in order to completely remove the driving element, the meter coils must be disconnected from the various terminal straps 37 by removing screws 36. Although it would seem from Fig. 1 that the screws 33 might not be readily accessible from the front of the meter, it is clear from Fig. 2 that the parts which in Fig. 1 partially hide these screws are so far in front of the screws as not to interfere noticeably with access to these screws. Thus, the upper screw 33 is even more accessible than the upper screw 31 and to unscrew the screws 33 it is merely necessary to insert the screw driver past the magnets 14 at a slight lateral angle.

*Par. A6.* Mounted on the electromagnetic core and forming a part of the driving element, is the light-load adjustment plate 90 (Fig. 10), the details of which are described under heading C. In connection with the present heading, it is noted that this adjustment plate is removable with and as a part of the driving element, and when the driving element has again been secured in place, the adjustment of the light-load adjustment plate 90 remains unchanged.

*Par. A7.* It should be observed that, by the exceedingly simple operations described, the damping magnet assembly can be removed, and after it the frame 12 and then the driving element 13. Likewise, the damping assembly and frame 12 may be removed together simply by unscrewing the screws 31, and the entire meter mechanism can be removed intact by unscrewing the screws 33 and 36. When removed, the mechanism may be maintained in upright position for testing or calibration by the name plate 18 which forms a wide base for the front of the mechanism.

*Par. A8.* In spite of the simplicity of assembly, complete and dependable rigidity is secured by virtue of the fact that the driving element 13 is screwed against the meter base at three widely spaced points, and the frame 12 is screwed tightly onto the driving element 13 at three points close to its three points of attachment to the base. In this connection, the two clamp plates 73 and the plate 74, described in paragraphs B8 and B10, which at present may all be regarded simply as lugs on the driving element, are very important, as are the spacer rivets 69. The spacer rivets 69 hold the plates 73 and 74 firmly onto the laminations of the driving element and by so doing furnish the ideal points for mounting the frame 12 on the driving element. Although there may be more than three points of attachment of the driving element to the base and of the frame to the driving element, this number is preferred, since three points determine a plane and therefore with three point attachment there is absolute rigidity without any possibility of rocking.

Par. A9. Because of mounting the frame at points adjacent to the mounting points of the driving element, movement of the frame due to possible resilience of the driving element is avoided when the meter mechanism is on the base. To obtain rigidity when the meter mechanism is removed from the base, it is of course necessary that the frame be rigid. The shape illustrated provides this rigidity.

B. Laminated core structure

Par. B1. There are several desirable features of the laminated core structure of the electromagnetic driving element which heretofore have not been fully attained or have not been attained to the best advantage. One of these is the provision of separable potential and current core structures which in use are accurately and firmly secured together in a manner which is both economical and easily accomplished. Another such desirable feature of this invention is the avoidance of excess cross-sectional metal in the core structure and particularly in the potential core structure with the resultant saving of weight and with the even more important results that the potential core structure is sufficiently flexible to be easily applied to the potential coil by hand, and a longer coil space may be provided. Further novel features are brought out in the following paragraphs.

Par. B2. The general shape of the laminations is shown best in Fig. 6, and these laminations, as finally joined together into the core structure, are shown best in Fig. 5. The laminations are preferably stamped from any one of the several suitable commercial forms of silicon steel. Although called a steel in the art and in this application, it is really an iron-silicon alloy possessing little or no magnetic retentivity, but high magnetic permeability. The laminations for the potential magnet form the pole piece or core portion 46, the outwardly and downwardly extending yoke members 47 including the connecting portions 50, the shunt members 49, and the joining portions 48. The laminations of the current magnet each includes the pole pieces 51 and the yoke 52 extending upwardly therefrom, which terminate in the joining portions 53. Of course the words "downwardly" and "upwardly" are always used by way of example, and if the parts of the meter were inverted the words should be interchanged.

Par. B3. It will be observed that the pole pieces 51 are substantially straight except for the small notch 54. This is contrary to the prior custom of providing inwardly extending overhanging pole pieces. The straight pole pieces have the important advantage of permitting the completed stack of current magnet laminations, as shown in Fig. 7, to be easily inserted into a previously wound current coil 56 which may be of the type shown or of other forms designed for particular types of service. The overhanging pole pieces have been used because they increased the useful magnetic flux cutting the disc, but they make it difficult to insert these pole pieces into the previously wound coil. However, the advantage of overhanging pole pieces is not lost by the present invention, since the overload compensating plate 58, which is subsequently added as shown in Fig. 7, has an effect similar to overhanging pole pieces in increasing the useful flux. From this standpoint the overload plate 58 should be considered as separable overhanging extensions for the pole pieces 51. The details and overload compensating functions of this overload plate are described below under heading D.

Par. B4. The shapes of both the current laminations and the voltage laminations are such as to make the coil space substantially as long as possible, consistent with the total space available. The relatively long current poles 51 and the proper spacing thereof make possible the substitution on these poles of a wide variety of different coils. Thus, for a nominal 5-ampere meter, a current coil having 24 turns, 12 on each pole, may be provided. For a 10-ampere meter, there would be only 12 turns, but the wire would be heavier. For a 15-ampere meter there would be only 8 turns, etc. Likewise, in 3-wire circuits, the coils may be staggered or reversed in position as diagrammatically illustrated at 56' in Fig. 17 by having one wire connected through the lower windings on one pole and the upper windings on the other pole and another wire connected in the opposite manner.

Par. B5. The relatively long coil space on the potential pole piece is particularly important since it permits a reduction in the resistance of the potential coil 61 and also gives greater flexibility to the lamination, as is described in Par. B7. The reduction of resistance in the potential coil is very important, since resistance in this coil results in the potential flux and the current flux being in proper phase relationship, as discussed in Par. C2. Necessity for proper phase relationship between the two fluxes is well known and need not be further explained. This desirable decrease in resistance of the potential coil 61 is accomplished by the provision of a relatively long coil space on the pole piece because of the fact that a larger proportion of the turns in the coil are adjacent or close to the pole piece. These turns are shorter in length than they would be if they were remote from the magnet core, so the average length of turn is shorter. In other words, a total length of wire used in the coil 61 is less than if the same number of turns of the same size wire were provided about a shorter pole piece. Instead of reducing the total length of wire, a wire having a slightly larger cross section, and consequently lower resistance, may be used. Spreading the coil lengthwise and reducing its total diameter also has the advantage of making more room available for other elements adjacent to the coil.

Par. B6. The coil space on the potential pole is made as long as the space requirements will permit, taking into consideration practical and commercial considerations. More specifically, it may be stated that the core space is as long as the vertical space requirements within the outlines of the core structure will permit. The outlines of the core structure are determined from practical commercial considerations. To this end of obtaining the maximum coil space, the portions of the yoke adjacent the upper end of the pole piece are made relatively thin so that each has a cross section not over one half the cross section of the pole piece, or even a trifle less. The pole piece itself is kept relatively small to keep the length of turn small. The pole piece and the connected portions of the yoke are preferably of such cross section that at rated voltage the maximum flux density is around or over 70,000 lines per square inch. Anything over 40,000 lines per square inch would be an improvement over the prior art, however.

Par. B7. The shape of the laminations of the potential magnet including both the long core member 46 and the relatively thin yokes 47, permits threading these laminations into the coil 61, as illustrated in Fig. 8. Several of these laminations, before they are joined together, are sprung by hand by raising the members 48 and pressing down on the pole pieces 46 until the members 48 will pass over the coil 61 while the pole piece 46 passes through the coil. Although the drawing is illustrated with only three laminations, it is clear that the same thing may be done with more laminations at one time. Indeed, for cores which do not exceed about three-eighths inch in total thickness, the flexibility is such that the entire core can be put on the coil by hand in one operation. If at first only part of the laminations are threaded through the coil, the succeeding groups are threaded into place, each over the preceding group. When all the laminations have thus been threaded into coil 61, they may be secured together at their top by the spacer rivet 63, and near the lower ends of the pole piece 46 and at the ends of the shunt members 48 by the screws 92 with which the light load adjustment plate 90 is mounted as described below in par. C3, and at the connection portions by screws 66, as described in the third paragraph below.

Par. B8. The laminations of the current magnet may be secured together even before the coil 56 is applied thereto. These laminations are secured together in any suitable manner, as by a rivet 68 at the bottom thereof, and spacer rivets 69 at the extremities thereof and extending through holes 71. The upper ends of the pole pieces may be secured together by rivets extending through the holes provided therein as seen in Fig. 6. It should be understood that it is very desirable that these various laminations be secured together firmly enough so that they will not vibrate, and to this end additional rivets may be provided wherever needed.

Par B9. The spacer rivets 69 after passing through the core, pass through holes 72 in the clamp plates 73, as illustrated best in Fig. 7. One of these clamp plates is shown in Fig. 13, and it will be observed that the rivet hole 72 is hexagonal in shape or otherwise non-circular, so that when the rivet has been upset therein it cannot turn with respect to clamp plate 73. The clamp plate 73 is provided at its lower edge with lugs 76 which engage the sides of the yoke 52 to prevent twisting of clamp 73 with respect to the yoke. When the coils have been placed on the respective magnets, the two magnets are placed together so that the laminations fit together as illustrated in Fig. 10. The notch 78 in the joining portion 53 is then in registry with the notch 79 in the joining portion 49 as shown in Fig. 6.

Par. B10. The clamps 81 are then placed across the two connection portions, and the screws 66 are passed through the clamps 81 and through the holes formed by the notches 78 and 79 and are screwed into the clamp plate 73. The tightening of these screws holds the laminations of the potential magnet firmly together. The accurate vertical positioning and alinement of the two stacks of laminations is accomplished by means of the screws 66, each of which forms a key fitting snugly into one of the holes formed by notches 78 and 79 and, in fact, preferably having to be forced into this hole. If desired, this hole and the portion of the screw 66 engaging it may be square in cross section, the screw being drawn tight by a nut. Lateral spreading of the connection portion 53 from the connection portion 49 is prevented by the lugs 83 formed on the clamp plate 81 and also by the lug 84 and the lugs 76 formed on the clamp plate 73. This provides an exceedingly rigid and very strong joint between the two magnets.

Par. B11. The clamp plates 73 form two of the lugs referred to in paragraph A8 by which the driving element is secured to the base. The third lug is formed by plate 74 which, as shown in Fig. 15, is provided with pressed out lugs 85 engaging the laminations 39 to prevent turning of the plate 74 and with a hexagonal rivet hole 72 to prevent turning of the spacer rivet 63 therein. Thus in each case the spacer rivet is firmly secured directly to the plate which is secured to the base and at a point thereon adjacent to the hole through which a screw 33 extends to secure the plate to the base. This provides an extremely firm assembly which is nevertheless free from trouble in commercial practice.

C. Light load adjustment

Par. C1. It is, of course, impossible to entirely eliminate friction in a meter, and the inevitable result is that with extremely light loads the driving torque may not be enough to overcome the friction and cause the meter disc to rotate. It has long been the practice to minimize the error due to friction by providing some form of light load adjustment having a slight and adjustable tendency to rotate the disc. According to the present invention, this light load adjustment takes a novel and extremely simple form and, as previously stated, is mounted on the driving unit so that the adjustment is not altered by temporary removal of the unit.

Par. C2. There is also a necessity for providing means for correcting the phase displacement of the magnetic fields of the two magnets forming the driving unit. Without going into the underlying theory, which is well known in the art, it may be briefly stated that it is necessary for the alternating magnetic flux generated by the coil 61 to lag 90° (a quarter of a cycle) behind the alternating flux generated by the current coil 56, assuming that the external circuits are such that the voltage and current being measured are exactly in phase. This 90° lag will be approximately accomplished by the high inductance of the potential coil. However, chiefly because of the resistance in the coil 61, its flux will not have quite the 90° lag required. Since, as discussed in Par. B5 the resistance of coil 61 is quite low, very little additional lag is necessary and this is produced by the light load adjustment plate 90 forming a closed circuit around the pole. This plate is therefore both a light load adjustment plate and a phasing plate. As a matter of fact, this plate alone would over-phase slightly, a conventional and adjustable coil (not shown) on the current poles making the phasing accurate. The phase correcting action of this plate 90 is independent of its lateral position about the pole, and so the adjustment of this plate may be described simply with regard to its effect on the light load adjustment.

Par. C3. The light load adjustment plate 90 is pivoted as by a rivet 88 to a suitable bracket 91 which is secured to the laminations adjacent the pole 46 in the manner shown best in Fig. 11. Two screws 92 formed of a non-magnetic material, such as brass, are passed through brass washers 93, insulating paper washers 94, and insulating sleeves 96, and this assembly is inserted into the holes 97 forming part of the gap between the shunt members 48 and the pole 46. At the far side of the laminations the screws pass through a voltage compensation plate 98 and screw into the bracket 91. The voltage compensation plate 98, which is old in principle, may be formed of any suitable magnetic metal such as a silicon steel. If desired, a non-magnetic spacer plate 99 can be placed between the plate 98 and the core laminations for the purpose of regulating the amount of flux leaking to the plate from the core and hence governing the character and amount of the voltage compensation obtained from plate 98. Tightening of the screws 92 simultaneously draws the bracket 91 firmly against the laminations so that it will be firmly supported thereby, and also squeezes the laminations together so that there will be no vibration of the laminations at this point. Likewise, with spacer 99 it insures accurate spacing between the voltage compensating plate 98 and both the shunt arm 48 and main pole 46.

Par. C4. As seen in Fig. 10, the light load adjustment plate 90 may be centered laterally with respect to the pole 46. When in this position, this light load adjustment plate 90 has no effect as such, since its magnetic action on one side of the pole tending to drive the meter disc in one direction balances its magnetic action on the other side of the pole tending to drive the meter in the opposite direction. However, as the light load adjustment plate 90 is moved away from this centered position, its driving effect in one direction or the other becomes increasingly greater. Of course, as a matter of practice, it will only be displaced in a direction having a tendency to drive the meter disc forwardly.

Par. C5. This adjusting movement is accomplished by means of a lever 101 (see Fig. 10) which at one end is rigidly secured to the light load adjustment plate 90 so as to rotate the same about its pivot pin 89. At the other end of the lever 101 is formed a fork 103 which, as shown in Fig. 3, fits into an annular slot (see Figs. 3 and 16) in a coupler 104, the bottom of said slot forming a pin 106. So that there will be no play in this connection, it is preferred that the lever 101 be formed of steel and that the bifurcations of its fork 103 resiliently engage the pin 106.

Par. C6. Through the upper portion of the coupler 104 is passed a screw 108 which passes through journal plates 109 and 110 secured to the core by a screw 112 (Fig. 5) passing through plate 110 and through the core and screwed into plate 109. The journal plate 110 is preferably formed of steel and has a bifurcated portion engaging a reduced portion formed by a slot in the screw 108. The slot is narrow enough to engage the plate 110 tightly, thus eliminating play at this point. Play between the screw 108 and the coupler 104 is eliminated by virtue of the fact that the coupler 104 is split, as shown best in Fig. 16, and biased in such a manner that it resiliently engages the threads on screw 108.

Par. C7. The light load adjustment may be made from the front of the meter, since the screw 108 extends through the frame 12 and its slotted head is sufficiently far in back of the damping magnet 14 so that the screw 108 may be engaged by a screw driver simply by tilting it slightly as it is inserted past the magnet 14. As the screw 108 is turned clockwise, as seen from the front, the coupler 104 is screwed to the left, as seen in Fig. 3, and the light load compensating plate 90 is shifted to the left, as seen in Fig. 5. The farther it is shifted, the greater tendency it has to drive the meter, and its position may be infinitesimally adjusted to provide exactly the amount of driving torque desired so that inspite of friction the meter will read acurately in the low range of ordinary loads. It should be noted that the construction described eliminates back-lash or play in the light load adjustment, so that small movements of the adjusting screw in either direction take immediate and full effect. Such desirable characteristics of adjustment are of extreme importance in commercial watt-hour meter testing practice.

D. Overload compensating plate

Par. D1. The so-called overload compensating plate 58 has two functions. One is to increase the torque of the meter by a minimum percentage at all times, due to the fact that it in effect forms an extension of the current poles 51. The other is to increase the torque by more than this minimum percentage for the higher current loads so as to make the meter measure these higher loads accurately.

Par. D2. It may be explained briefly that the magnetic flux which cuts the meter disc has two effects upon the disc. One is a driving effect, produced by coaction between the current flux and the potential flux. The other is a damping effect in which the flux of each magnet acts alone in the same way as the flux of the damping magnet. Since the damping effect of the curent magnet becomes stronger as the curent increases in proportion to the square of the curent, it causes errors at the heavier loads unless compensation is provided. In Fig. 12 the straight portion AB of the lower curve shows that the meter when not compensated, measures with substantially uniform accuracy at low courrent loads, and the portion BC shows that as the current increases, the accuracy drops. In short, the curve shows that above the point B the available flux of the current magnet must be progressively more fully utilized to bring the net driving torque up to the desired value.

Par. D3. Compensation for heavy loads by progressively greater utilization of current pole flux has long been practiced. In the present invention this progressively greater utilization is secured by the use of an overload compensating plate which, as an important incidental feature, gathers in a portion of the flux leaking from the current poles and is positioned and shaped to form in effect an extension of the poles and to cause part of the flux leaking into the plate to cut the disc. For simplicity the flux leaking into the plate may be called plate flux. It is this plate flux which is progressively more fully utilized at heavy loads in order to provide the necessary compensation. The greater utilization at heavy loads is obtained by virtue of the fact that the plate is constructed to prevent the greater utilization at light loads by shunting a large proportion of the plate flux directly through the plate from one current pole to the other. As the current load increases, however, the shunt approaches the saturation point so that it diverts from the disc a smaller and smaller proportion of the total plate flux. The result is that a progressively larger proportion of this flux cuts the meter disc. This progressive increase of the percentage of flux cutting the disc (progressively greater utilization) should balance the progressive increase of damping effect of the current flux, if the overload compensating device is properly designed, so that the meter will read accurately for a much higher range of loads than it would otherwise.

Par. D4. It might be mentioned that the term "overload" is really a misnomer, since the present meter is designed to cary continually loads for which considerable compensation is required. Thus a so-called 5-ampere meter is really at least a 15-ampere meter, and the overload compensating plate should really be called a heavy-load compensating plate. However, since the term "overload compensating plate" is well known in the art, it is used in this application. Of course if the meter is designed with relatively low current flux so that the point B is above the loads the meter is expected to carry, compensation would not be necessary except for true overloads, but for various reasons it is preferred not to resort to this manner of avoiding error, and in the commercial meter mentioned the point B is well below the true maximum rated load, so considerable compensation is desired.

Par. D5. According to the present invention, the overload compensating plate 58 may include any number of laminations (preferably three) which may be stamped from any soft magnetic metal such as iron alloys known as silicon steel. A silicon content of approximately .01 has been found especially satisfactory. Each of the laminations is preferably shaped as shown in Fig. 9. This identical shaping of these plates with the attendant simplification of manufacture, though not essential, is one of the possible advantages of this invention. These magnetic laminations may be mounted on a non-magnetic carrier plate 116 and may be secured together and to said carrier plate by suitable rivets, as illustrated, so as to prevent vibration. The assembled overload compensating plate 58 is then slid into the position shown best in Fig. 7, with its magnetic laminations partially surrounding the current poles 51, but preferably entirely out of contact therewith. The carrier plate 116 slides into the notches 54 and it is a trifle oversize with respect to these notches so that it will not be easily moved therein. As is seen best from Fig. 9, in which the positions of the poles 51 are shown in dotted lines, the magnetic laminations of the overload plate 58 do not contact the poles 51. They are prevented from being slid in against said poles by the shoulder 118 on the carrier plate. However, in practice a temporary spacer gauge (not shown) will usually be placed between the laminations of the overload plate and the pole 51 as the overload plate is slid into place so as to exactly position the laminations irrespective of the shoulder 118. It is desirable that the spacing be exact so that the desired amount of magnetic flux will leak from the poles 51 to the laminations of the overload plate 58. Although a gap of .03 to .04 inch at the point 119 has been found most commonly satisfactory commercially, this varies with the metals used, and of course might vary considerably with different designs of meters. At the points 120 the gaps of approximately 1/32 inch have been found very satisfactory.

Par. D6. The overload plate 58 is provided with two shunt paths, one of which is a short path 121 directly between the poles and having a cross section determined by the depth of the slots 122. The other is the long path 124 passing around the slot 123. At low loads the great majority of the magnetic flux diverted from the disc by the overload compensating plate 58 will pass through the short shunt path 121. However, as the load is increased to the point where compensation is needed, this path approaches close enough to the saturation point so that it does not carry additional flux as readily, and therefore more of the flux must pass through the disc or the long shunt path 124 and, since this long path carries the flux much less readily than the short path 121, it follows that a smaller proportion of the flux is diverted and that therefore a larger proportion cuts the disc. With only the short path 121, this effect would be quite sudden as the current increases, and would produce over-compensation, but this is avoided by the longer shunt path 124. By controlling the dimensions of the long path 124 by forming it wider or trimming it, or by virtue of lengthening or reducing the slot 123, and by controlling the cross section of the short path 121 by virtue of lengthening or shortening the slots 122, the overload plate may be caused to always divert just the proper amount of flux from the disc so that progressively more flux will cut the disc in order to cause the meter to register accurately as the current load increases.

Par. D7. An important feature of the illustrated overload plate, in addition to that mentioned in Par. D5, is that it greatly facilitates the designing of a proper plate for a particular meter, since changing the lengths of the slots 122 and the slots 123 as tests may show to be necessary, will accomplish such a wide range of compensating characteristics. The shape shown in Fig. 9 has been found satisfactory for the type MF meter manufactured by the Duncan Electric Manufacturing Company, and its effect on this meter is illustrated in Fig. 12.

Par. D8. In this chart the various curves indicate the approximate readings of the meter for various percentages of the rated current with and without the overload compensating plate. The lower curve ABC represents the readings of the meter with the overload compensating plate removed, and it is seen that, although this curve is substantially level from A to B, it drops fairly rapidly from that point on. The dotted line BD which continues level from the point B is what the readings would have been, had the meter remained as accurate beyond the point B as for the lower loads. The area between the uncompensated curve ABC and this dotted line DD has been shaded to indicate the amount of compensation necessary. The upper curve A'B'D' represents the readings of the meter with the overload compensating plate applied thereto and is substantially level throughout its length, thus showing that the compensating plate has had the proper compensating effect to produce the compensation indicated by the shaded area. It will be observed that this curve is approximately 7% above the line ABD. This is because the overload compensating plate not only compensates by the amount indicated by the shaded area, but also increases the useful flux about 7% throughout the length of the curve. Fig. 12 makes clear that the compensation extends at least from point B' to the right throughout the curve, maintaining this curve substantially on the 100% accuracy line beyond the actual capacity now commercially required (300% of the nominal and arbitrary current rating). In fact, even at 400% of the nominal current rating, the accuracy of the meter is only slightly less than 100%.

E. Upper journal for the disc

*Par. E1.* The disc 11 is carried by a shaft 131 which at its lower end is supported on a suitable bearing, such as a jewel bearing, in a manner already well known in the art. In the upper portion of the shaft are cut worm gear threads 132 (Fig. 4) which engage a suitable worm wheel 134 (Fig. 1) which drives the register 17. It is of course important that the upper end of the shaft be maintained in the desired position with a minimum of friction and a maximum reliability, but with as little expense as is consistent with these two major requirements. Heretofore, as in the present invention, the upper end of the shaft has been journaled by providing a fixed flexible pin 136 extending into a suitable bore 137 in the head of the shaft 131. Since, when the shaft is vertical the disc and shaft are substantially balanced, it follows that there is substantially no pressure between the pin 136 and the shaft 131, and hence there is extremely little friction and extremely little wear. It follows that this arrangement is very dependable, provided of course that the pin 136 is originally properly supported and positioned.

*Par. E2.* Heretofore the pins have usually been driven into place in their supporting members, but according to the present invention they are mounted in a more simple and reliable manner. A socket 139 screws through a bracket 141 formed on the frame 12. The socket 139 is hollowed out as by drilling, to form a bore 143 which at its inner and upper end is preferably beveled sharply toward the center by the drill so as to center the pin 136 when it is thrust against this inner end of the passage 143. After drilling, the inner end portion of the bore is slightly enlarged by an undercutting tool. The pin is secured in place by solder 146 which is very reliable because of the undercutting.

*Par. E3.* In assembly, the socket 139 is held with its open end up and a pill of solder is dropped into the passage 143. The pin 136 is then inserted in the passage, its outer end being centered therein by a suitable ring gauge. Then the socket 139 is heated until the solder therein melts, permitting the pin 136 to drop against the inner end of the passage 143. The heat is then removed so that the solder 146 solidifies and holds the pin in place with absolute dependability. The use of the ring gauge during securing, together with the fact that the pin is never placed under any strain which might distort it, insures absolute centering of the pin 136 in the socket 139. The taper of bore 143 eliminates all possibility of slipping of the congealed solder 146.

*Par. E4.* The lower end of the socket 139 has formed thereon an annular downwardly extending flange 148 which surrounds the head 149 of the shaft 131. Although the ring 148 does not normally touch the head 149, it does limit the movement of the latter during shipping or due to other abnormal causes. The head 149 may be integral with the shaft or it may be a sleeve or cap applied thereto.

F. General combination

*Par. F1.* Although most of the novel features which have been discussed may be used in any watt-hour meter, and perhaps some of them elsewhere, they are for the most part definitely related to one another so that any particular novel feature not only is advantageous in itself but also forms a part of or contributes toward another feature or enhances the advantages thereof.

*Par. F2.* For example, the overload plate not only has the advantage of ready design discussed in Par. D7, but it also has the advantage of obtaining more torque-producing current flux while permitting, on account of its removability, the easy application of the current coils on the current poles. Likewise, the shape of the potential laminations not only has the electrical advantages of permitting the use of a low resistance potential winding, but also facilitates assembly by virtue of its flexibility so that these laminations may be easily threaded into the potential coil by hand, as described in Par. B7.

*Par. F3.* Another multiple advantage is found in the means for securing the potential core and current core together. Not only do the plates 73 and 81 and key screws 66 secure the two cores in a dependably accurate relationship (Par. B10), but the plates 73 also form two of the three lugs by which the entire driving unit, and in fact the entire meter element, is secured to the meter base. The use of these lugs permits removal of the meter element or driving unit from the base by screws readily accessible from the front of the meter. At the same time the spacer rivets 63 and 69 not only secure the plate 73 to the current laminations and secure the current laminations together, but also furnish support posts for the meter frame. It is particularly advantageous to have these support posts rigidly mounted on plates 73 and 74 close to the screws 33 securing these plates 73 and 74 to the base, since this makes the support of the meter frame as firm as that of the driving element and normally independent of the driving element, and substantially prevents any relative flexibility between the two, while permitting them to be removed as an assembled meter element when desired.

*Par. F4.* As discussed fully under heading A, the use of the forwardly facing screws 33 for attaching the core of the driving unit structure to the meter base, the use of the forwardly facing screws 31 for attaching the frame 12 to the core structure of the driving element and the use of the forwardly facing screws 24 for attaching the damping magnet assembly to the meter frame, result in a meter which may be completely disassembled and re-assembled from the front of the meter while the meter base remains in place on a wall. Furthermore, the major parts of the meter named may be taken out either altogether or one at a time, and their removal does not affect the meter adjustments.

*Par. F5.*—In connection with the meter adjustments, it is noted that the particular structure and mounting of the light load adjustment features discussed under heading C are advantageous not only because their adjustment is not changed when the core is removed, but are further advantageous because of their simplicity of manufacture, and accuracy, dependability and convenience of adjustment. An important feature contributing to these various advantages is the mounting of the light load adjustment entirely on the laminated core. The adjusting screw 108, it should be noted, is accessible from the front of the meter, and the entire light load adjustment system is free from backlash or play, with the result that minute turns of the screw 108 in either direction are sure to make the corresponding amount of adjustment.

*Par. F6.*—One important feature of the invention which concerns the various parts thereof is the freedom of the entire unit from filings or other particles of magnetic metal. Any such particles are very objectionable in a meter, since they collect on the permanent magnets and tend to retard the rotation of the meter disc. Heretofore, with meters including machined parts of magnetic metal, it has been extremely hard to eliminate such particles because once they are present on the parts which go into the meter, it is almost a commercial impossibility to entirely and dependably remove them from such parts, even with an air blast. In the present meter, the base and frame are die cast from aluminum, and the only parts within the case, except in the damping magnet assembly, which should be formed of a magnetic metal are the core laminations and clamps, the overload compensating plate laminations, and the steel members 101, 109 and 110 which are used in the light load adjustment structure. Since all of these parts are shaped by stamping, there is little likelihood of any minute magnetic particles ever being found thereon. Furthermore, since the assembled core structure and clamp plates are dipped in an insulating varnish, thus sealing any foreign particles thereon, the presence of any loose magnetic particles within the case is almost impossible.

*Par. F7.* Although the various features have been illustrated in connection with a single phase meter, they are all useful in polyphase meters as well. In fact, the principles of the support and assembly features are of especial value in polyphase meters where the problem of compactness and accessibility is even more acute.

*Par. F8.* The meter illustrated is already in extensive commercial use, and its favorable reception may be considered evidence both of its practicability and of the fact that it represents a decided advance over prior meters in spite of the fact that the latter had given such good service as apparently to negative the possibility of such a decided advance.

*Par. F9.* Although but a few embodiments of my invention have been herein shown and described, it is to be understood that the invention is not limited thereby, but is to be limited only by the prior art. The following claims are intended to point out some of the features now recognized as new, rather than to limit the invention to these features. The headings in the claims are used for convenience only and are not to be considered as narrowing the scope of the claims.

I claim:

1. A watt-hour meter including a base, an electro-magnetic driving unit including potential and current magnets removably secured to said base by means accessible from the front of the meter, a light load adjusting device secured to the core of said potential magnet, adjustable with respect thereto and removable therewith while its adjustment is mantained constant; a disc-carrying frame removably secured to and supported entirely by the core structure of said magnets by means accessible from the front of the meter, and a damping magnet assembly removably secured to said frame by means accessible from the front of the meter and including an adjustment device removable therewith without disturbing the adjustment, said frame and damping magnet assembly being removable together as a unit.

2. A watt-hour meter including a base, a driving unit assembly secured thereto including an adjustment device, a frame secured to and supported entirely by said assembly and carrying a meter disc, and a damping magnet assembly carried by the frame and including an adjustment device, said damping magnet assembly being removable while its adjustment is maintained constant, said frame being removable from the front of the meter with said damping magnet assembly, and said driving unit assembly being removable from the front of the meter without disturbing its adjustment and, optionally with the meter mechanism intact thereon or after said frame has been removed.

3. A watt-hour meter including a base, a driving unit including a laminated magnetic core structure, lugs secured to and extending outwardly from said core structure and removably secured to said base by means accessible from the front thereof, and a meter frame and damping magnet assembly supported entirely by said driving unit.

4. A watt-hour meter including a base and a meter element which includes a driving unit, a frame carried thereby, a damping magnet assembly and a disc carried by the frame, said driving unit including a laminated core structure secured to said base at three widely spaced points, and said frame being secured to said core structure at three points close to said three widely spaced points by screws accessible from the front of the meter, and said core structure being secured by lugs extending outwardly therefrom and secured to the base by screws accessible from the front thereof.

5. A watt-hour meter including a base, a driving unit including a laminated magnetic core structure, lugs secured to and extending outwardly from said core structure and removably secured to said base by means accessible from the front thereof, and a meter frame and damping magnet assembly supported by said driving unit, said core structure being formed of two separable stacks of laminations secured together in part by plates on which some of said lugs are formed.

6. A watt-hour meter including a base, a driving unit including a laminated magnetic core structure, lugs secured to and extending outwardly from said core structure and removably secured to said base by means accessible from the front thereof, and a meter frame and damping magnet assembly supported by said driving unit, said core structure being formed of two separable stacks of laminations secured together in part by plates on which some of said lugs are formed, securing means rigidly mounted with respect to said lugs and securing said lugs to said stacks of laminations, said frame being mounted on said securing means 7. A watt-hour meter including a base, a driving unit having a laminated core structure, lugs outstanding from said core structure, rivets rigidly securing said lugs to said core structure, and a meter frame and damping magnet assembly supported by said rivets.

8. A watt-hour meter including a base, a driving unit having a laminated core structure, lugs outstanding from said core structure, rivets rigidly securing said lugs to said core structure, and a meter frame and damping magnet assembly supported by said rivets by screws screwing into the heads thereof, said heads being elongated to properly space said frame from said core structure.

9. A driving element for watt-hour meters including a potential magnet formed of a stack of laminations, a current magnet formed of a stack of laminations, said magnets including yoke portions telescoped one within another, and means for securing said magnets in the telescoped position including a separable key positioned between the telescoping portions and extending into notches in both of said magnets and securing them in exact alinement.

10. A driving element for watt-hour meters including a potential magnet formed of a stack of laminations, a current magnet formed of a stack of laminations, said magnets including yoke portions telescoped one within another, and means for securing said magnets in the telescoped position including a separable key positioned between the telescoping portions and extending into notches in both of said magnets and securing them in exact alinement, and a clamping plate having lugs extending on opposite sides of the telescoping portions to prevent the spreading apart thereof.

11. A driving element for watt-hour meters including a potential magnet formed of a stack of laminations, a current magnet formed of a stack of laminations, said magnets including overlapping yoke portions, and means for securing said magnets in the overlapping position including a separable key positioned between the overlapping portions and extending into notches in both of said magnets and securing them in exact alinement, and means for preventing the spreading apart of the overlapping portions.

12. A driving element for watt-hour meters including a potential magnet formed of a stack of laminations, a current magnet formed of a stack of laminations, said magnets including overlapping yoke portions, and means for securing said magnets in the overlapping position including a separable key positioned between the overlapping portions and extending into notches in both of said magnets and securing them in exact alinement, and a clamping plate engaging one of the overlapping portions and having a lug extending on the opposite side of the associated overlapping portion to prevent the spreading apart thereof, said plate having a lateral extension thereon forming an attachment lug for securing said driving unit in place on a meter base.

13. A driving element for watt-hour meters including a potential magnet formed of a stack of laminations, a current magnet formed of a stack of laminations, said magnets including overlapping yoke portions, means for securing said magnets in the overlapping position including a separable key positioned between the overlapping portions and extending into notches in both of said magnets and securing them in exact alinement, and a clamping plate engaging one of the overlapping portions and having a lug extending on the opposite side of the associated overlapping portion to prevent the spreading apart thereof, and a rivet for securing said clamping plate to one of said magnets and at the same time clamping the laminations of said magnet together.

14. A watt-hour meter including a driving element comprising a potential magnet formed of a stack of laminations, a current magnet formed of a stack of laminations, said magnets including overlapping yoke portions, means for securing said magnets in the overlapping position including a key positioned between the overlapping portions and extending into notches in both of said magnets, a clamping plate engaging one of the overlapping portions and having a lug extending on the opposite side of the associated overlapping portion to prevent the spreading apart thereof, a rivet for securing said clamping plate to one of said magnets and at the same time clamping the laminations of said magnet together, and a frame carrying other meter parts and secured to said rivet by a screw screwing into the head thereof.

15. A watt-hour meter including a driving element comprising a potential magnet formed of a stack of laminations, a current magnet formed of a stack of laminations, said magnets including overlapping yoke portions, means for securing said magnets in the overlapping position including a key positioned between the overlapping portions and extending into notches in both of said magnets, a clamping plate engaging one of the overlapping portions and having a lug extending on the opposite side of the associated overlapping portion to prevent the spreading apart thereof, a rivet for securing said clamping plate to one of said magnets and at the same time clamping the laminations of said magnet together, and a frame carrying other meter parts and secured to said rivet by a screw screwing into the head thereof, said clamping plate having a non-circular hole therein in which said rivet is riveted to prevent said rivet from rotating when the screw securing the meter frame is tightened.

16. A watt-hour meter including a driving element comprising a potential magnet formed of a stack of laminations, a current magnet formed of a stack of alminations, said magnets including overlapping yoke portions, means for securing said magnets in proper relationship including a clamping plate engaging one of the overlapping portions, and having a lug extending on the opposite of the associated overlapping portion to prevent the spreading apart thereof, a rivet for securing said clamping plate to one of said magnets and at the same time clamping the laminations of said magnet together, and a frame carrying other meter parts and secured to said rivet by a screw screwing into the head thereof.

17. A watt-hour meter including a driving element comprising a potential magnet formed of a stack of laminations, a current magnet formed of a stack of laminations, said magnets including overlapping yoke portions, means for securing said magnets in proper relationship including a clamping plate engaging one of the overlapping portions, and having a lug extending on the opposite side of the associated overlapping portion to prevent the spreading apart thereof, a rivet for securing said clamping plate to one of said magnets and at the same time clamping the laminations of said magnet together, and a frame carrying other meter parts and secured to said rivet by a screw screwing into the head thereof, said clamping plate having a non-circular hole therein in which said rivet is riveted to prevent said rivet from rotating when the screw securing the meter frame is tightened.

18. A watt-hour meter including a potential magnet having a potential coil and a stack of magnetic laminations, said laminations each having a downwardly extending core as narrow at its lower end as its center portion, yokes extending laterally and downwardly from the upper end of the core, and shunt arms extending from between said yokes toward said core, said length of the core between said shunt arms and said yokes being at least approximately 2½ times its width, and said yokes having a width substantially throughout their length substantially as small as one-half the width of said core, whereby relatively great flexibility of said laminations is obtained to facilitate their being threaded through said coil, and said coil having its turns distributed substantially uniformly along the length of the core between its junction with said yokes and said shunts and having its turns wound as close as practical to said poles piece whereby said coil is of relatively low resistance.

19. A watt-hour meter including a potential magnet having a potential coil and a stack of magnetic laminations, said laminations each having a downwardly extending core as narrow at its lower end as at its center portion, yokes extending laterally and downwardly from the upper end of the core, shunt arms extending from between said yokes toward said core, said length of the core between said shunt arms and said yokes being at least approximately 2½ times its width and said yokes having a width at least in the region of their junction with the core substantially as small as one-half the width of said core, whereby relatively great flexibility of said laminations is obtained to facilitate their being threaded through said coil, and said coil having its turns distributed substantially uniformly along the length of the core between its joint with said yokes and said shunts, and having its turns wound as close as practical to said pole piece, whereby said coil is of relatively low resistance.

20. A watt-hour meter including a potential magnet having a potential coil and a stack of magnetic laminations, said laminations having a downwardly extending core, yokes extending laterally and downwardly from the upper end of the core, shunt arms extending between said yokes and said core, said core between said shunt arms and said yokes being relatively long, and said yokes having a cross section, at least in the region of their junction with the core, substantially as small as one-half the cross section of said core, and sufficiently small so that the flux density therein at rated voltage is over 40,000 lines per square inch, and said coil having its turns distributed substantially uniformly along the length of the core between its joint with said yokes and said shunts, and having its turns wound as close as practical to said pole piece, whereby said coil is of relatively low resistance.

21. A watt-hour meter including a potential magnet having a potential coil and a stack of magnetic laminations, said laminations having a downwardly extending core, yokes extending laterally and downwardly from the upper end of the core, shunt arms extending between said yokes and said core, said core between said shunt arms and said yokes being relatively long and said yokes having a cross section, at least in the region of their junction with the core, substantially as small as one-half the cross section of said core, and sufficiently small so that the flux density therein at rated voltage is over 40,000 lines per square inch, and said pole piece being sufficiently small so that the flux density therein is at least approximately 50,000 lines per square inch, and said coil having its turns distributed substantially uniformly along the length of the core between its joint with said yokes and said shunts, and having its turns wound as close as practical to said pole piece, whereby said coil is of relatively low resistance.

22. A watt-hour meter including a disc, a voltage magnet having a pole adjacent the disc, a separable current magnet operating on said disc and including a stack of magnetic laminations forming cores for receiving a coil and terminated in end poles, the main portions of the cores being substantially as large in cross section as the poles, and said poles being free from overhanging portions, whereby a pre-wound current coil fitting snugly around said cores may be easily applied thereto, and a removable inwardly overhanging magnetic extension for each of said poles extending almost midway between the poles for increasing the effective overlap of the current magnet and the voltage pole and thus increasing the flux cutting said disc.

23. A watt-hour meter including a disc, a separable current magnet operating on said disc and including a stack of magnetic laminations forming cores for receiving a coil and terminated in end poles, the main portions of the cores being substantially as large in cross section as the poles, said poles being free from overhanging portions, whereby a pre-wound current coil fitting snugly around said cores may be easily applied thereto, and a removable overhanging magnetic extension for at least one of said poles for increasing the flux for cutting said disc, said extension including a U-shaped portion fitting around said pole to receive flux from at least three sides thereof.

24. A watt-hour meter including a disc and a driving unit having a potential pole above said disc and two current coil receiving cores below said disc, said cores having end poles adjacent said disc which are free from overhanging portions, whereby a pre-wound coil may be easily applied over said current poles onto said cores, and an overload compensating plate extending between said current poles and under said potential pole, said overload plate being positioned to facilitate the flow of flux from said current poles through said disc to said potential pole and having a magnetic shunt path of relatively small cross section approximately centered between the current poles for diverting from the disc a small portion of the flux which decreases in its proportion to the total flux as the total flux increases.

25. A watt-hour meter including a rotatable disc and a driving element therefor, including current magnet having two opposed poles adjacent said disc and an overload compensating plate extending between said poles but magnetically separated therefrom and including two flux paths of different length extending between said poles, the shorter of which paths is of such cross section that it carries a considerable but progressively decreasing proportion of the flux entering said plate through the range of increasing current values for which compensation is needed.

26. A watt-hour meter including a rotatable disc and a driving element therefor, including a current magnet having two opposed poles adjacent said disc and an overload compensating plate extending between said poles and including two flux paths of different length extending between said poles, the shorter of which paths is of such cross section that it carries a considerable but progressively decreasing proportion of the flux entering said plate through the range of increasing current values for which compensation is needed, said overload compensating plate being supported out of contact with said poles by a non-magnetic spacer fitting into notches in said poles and slightly oversized with respect thereto.

27. A watt-hour meter including a rotatable disc and a driving element therefor including a current magnet having two opposed poles adjacent said disc and an overload compensating plate extending between said poles and including two flux paths of different length extending between said poles separated by at least two slots disposed at approximately right angles, the shorter of which paths is of such cross section that it carries a considerable and progressively decreasing proportion of the flux entering said plate through the range of increasing current values for which compensation is needed.

28. A watt-hour meter including a rotatable disc and a driving element therefor including a current magnet having two opposed poles adjacent said disc and an overload compensating plate extending between said poles and including a plurality of substantially identical laminations each having two flux paths of different length extending between said poles separated by a slot, the shorter of which paths is of such cross section that it carries a considerable and progressively decreasing proportion of the flux entering said plate through the range of increasing current values for which compensation is needed.

29. A watt-hour meter including a rotatable disc and a driving element therefor including a current magnet having two opposed poles adjacent said disc and an overload compensating plate extending between said poles and including two flux paths of different length extending between said poles separated by a slot, the shorter of which paths is of such cross section that it carries a considerable and progressively decreasing proportion of the flux entering said plate through the range of increasing current values for which compensation is needed, said plate including a plurality of laminations positioned between said poles so that the flux enters the edges of said laminations and riveted at a plurality of points to a non-magnetic plate whereby vibration of said laminations is substantially eliminated.

30. A watt-hour meter including a rotatable disc and a driving element therefor including a current magnet having two poles adjacent said disc and an overload compensating plate extending between said poles and including two flux paths of different length, the shorter of which paths is of such cross section that it carries a considerable but progressively decreasing proportion of the flux entering said plate through the range of increasing current values for which compensation is needed, said overload compensating plate being supported out of contact with said poles by a non-magnetic spacer sliding into notches in said poles, said plate having laterally extending portions which approach said poles as said spacer is slid into said notches.

31. A watt-hour meter including a driving element including a potential magnet having an upwardly extending pole piece and yokes extending laterally and downwardly therefrom, shunt members extending from said yoke members toward the lower end of said core, a bracket secured to said core by two screws extending between said shunt members and said core and on each side thereof, a light-load adjustment and phasing plate surrounding said pole piece and pivoted to said bracket, and means supported by said driving unit for pivoting said plate to secure light-load adjustment.

32. A watt-hour meter including a driving unit having a potential pole piece, a light load adjusting circuit member in inductive relation therewith and pivotally supported by said driving unit, means for pivoting said circuit member to effect light load adjustment comprising a screw supported by the driving unit and accessible from the front of the meter, and a coupler shiftable by said screw and substantially free from play with respect thereto and having a substantially free from play driving relation with said circuit member.

33. A watt-hour meter including a driving unit having a potential pole piece, a light load adjusting circuit member in inductive relation therewith and pivotally supported by said driving unit, means for pivoting said circuit member to effect light load adjustment comprising a screw pivotally supported by said driving unit and accessible from the front of the meter, a split coupler screwed on and shiftable by said screw and resiliently engaging it to be substantially free from play with respect thereto and having a substantially free from play driving connection with said circuit member comprising a lever rigidly secured to said circuit member and engaging said coupler between bifurcated members biased to squeeze said coupler therebetween.

34. A watt-hour meter including a driving unit having a potential pole piece, a light load adjusting circuit member in inductive relation therewith and pivotally supported by said driving unit, means for pivoting said circuit to effect light load adjustment comprising a screw pivotally supported by said driving unit and accessible from the front of the meter, a coupler shiftable by said screw and substantially free from play with respect thereto and having a substantially free from play driving connection with said circuit member comprising a lever rigidly secured to said circuit member and engaging said coupler between bifurcated members biased to squeeze said coupler therebetween.

35. A watt-hour meter including a potential magnet having a potential coil and a stack of magnetic laminations, said laminations each having a downwardly extending core, yokes extending laterally and downwardly from the upper end of the core and shunt arms extending from between said yokes toward said core, a bracket bridging across said shunt arms and said core, a pair of screws extending between said shunt arm and said core and securing said bracket in place and securing the laminations of said shunt arms and said core firmly together, and light load adjustment means adjustably supported by said bracket.

STANLEY S. GREEN.

CERTIFICATE OF CORRECTION.

Patent No. 2,167,649.                                        August 1, 1939.

STANLEY S. GREEN.

It is hereby certified that error appears in the printed specification of the above numbered patent requiring correction as follows: Page 8, second column, line 13, claim 2, after the word "optionally" insert a comma; page 9, second column, line 32, claim 16, for "alminations" read laminations; line 37, same claim, before "of" insert side; page 10, second column, line 46, claim 25, after "including" insert a; and that the said Letters Patent should be read with this correction therein that the same may conform to the record of the case in the Patent Office.

Signed and sealed this 10th day of October, A. D. 1939.

(Seal)                                                                  Henry Van Arsdale,
Acting Commissioner of Patents.